US009843522B2

(12) United States Patent
Ramamoorthy et al.

(10) Patent No.: US 9,843,522 B2
(45) Date of Patent: Dec. 12, 2017

(54) EFFICIENT MECHANISM TO IMPROVE DATA SPEED BETWEEN SYSTEMS BY MPTCP AND MIMO COMBINATION

(71) Applicants: Kumaralingam Ramamoorthy, Chennai (IN); Jayaramakrishnan Sundararaj, Tiruppur (IN)

(72) Inventors: Kumaralingam Ramamoorthy, Chennai (IN); Jayaramakrishnan Sundararaj, Tiruppur (IN)

(73) Assignee: HCL TECHNOLOGIES LTD., Chennai (IN)

( * ) Notice: Subject to any disclaimer, the term of this patent is extended or adjusted under 35 U.S.C. 154(b) by 300 days.

(21) Appl. No.: 14/680,080

(22) Filed: Apr. 7, 2015

(65) Prior Publication Data

US 2015/0295782 A1 Oct. 15, 2015

(30) Foreign Application Priority Data

Apr. 9, 2014 (IN) ........................... 1871/CHE/2014

(51) Int. Cl.

*G06F 15/16* (2006.01)
*H04L 12/801* (2013.01)
*H04L 29/06* (2006.01)
*H04B 7/0413* (2017.01)
*H04L 5/00* (2006.01)
*H04L 12/707* (2013.01)

(52) U.S. Cl.

CPC ...... *H04L 47/193* (2013.01); *H04L 29/06088* (2013.01); *H04L 29/06129* (2013.01); *H04L 69/14* (2013.01); *H04L 69/16* (2013.01); *H04B 7/0413* (2013.01); *H04L 5/0023* (2013.01); *H04L 45/24* (2013.01); *H04L 47/12* (2013.01)

(58) Field of Classification Search

CPC ... H04L 29/0612; H04L 69/14; H04L 69/165; H04L 69/18; H04L 29/06088; H04L 29/06129; H04W 76/02–76/068; H04B 7/0413

See application file for complete search history.

(56) References Cited

U.S. PATENT DOCUMENTS

2012/0057578 A1* 3/2012 Park ...................... H04W 76/02 370/338
2014/0173123 A1* 6/2014 Graessley ........... H04L 61/6086 709/228
2014/0362765 A1* 12/2014 Biswas .............. H04W 76/026 370/328

* cited by examiner

*Primary Examiner* — Brendan Higa
(74) *Attorney, Agent, or Firm* — Mannava & Kang, P.C.; Vinay Malik

(57) ABSTRACT

An apparatus for improving data transfer speed by using Multipath Transport Control Protocol (MPTCP) and Multiple-Input Multiple-Output (MIMO) combination, wherein the apparatus comprises a user interface module called Application Management System (AMS) module (100) to receive user inputs for managing transport protocol (MPTCP or conventional TCP/UDP/SCTP) usage selection. The apparatus also includes a Selection, Inspection Control (SIC) middleware module (101) which STARTs and STOPs the corresponding MPTCP module or conventional TCP/UDP/SCTP module based on the user inputs received from AMS. The MPTCP module splits the data traffic into multiple TCP subflows and sends the subflows via wired network interface (104), wherein each network interface is connected to one MIMO systems (107) for achieving efficient data transfer.

11 Claims, 5 Drawing Sheets

EFFICIENT MECHANISM TO IMPROVE DATA SPEED BETWEEN SYSTEMS BY MPTCP AND MIMO COMBINATION

TECHNICAL FIELD

Embodiments disclosed herein relates to apparatus and method for improving data transfer speed in a network using Multipath Transmission Control Protocol (MPTCP) and Multiple-Input Multiple-Output (MIMO) combination.

BACKGROUND

The modern communications era has brought a remarkable expansion of wired and wireless data transmission networks. Data transmission plays a vital role in the communication industry and nowadays people are interested in transferring huge data between multiple host systems. This can be achieved using advanced technologies available for data communication such as Multipath Transmission Control Protocol (MPTCP), Long Term Evolution (LTE), LTE-Advanced (LTE-A), 4G and other wireless technologies. However, this could be a challenging task for the current systems that are available to support these advanced networking technologies. Some computing systems have the capability to use any one of the above mentioned advanced technologies but those systems do not provide flexibility to the user to choose between two or more data transmission protocols and does not offer high speed data connection between the host and destination systems/servers as required.

Current system and method relating to data transfer utilize transport protocols, such as MPTCP, Multi-Connection TCP (MCTCP) or Concurrent Multipath Transfer-Stream Control Transmission Protocol (CMT-SCTP) and the conventional TCP/SCTP to enable communication between a source host system and multiple destinations.

Further, wireless communication device can be Personal Digital Assistant (PDA), handheld/portable mobile telephone and portable computer, wherein the device communicates IP flow simultaneously over multiple heterogeneous network access interfaces using MPTCP or User Datagram Protocol (UDP) or TCP.

But, the existing system and method do not have a proper mechanism to utilize all available network interfaces and all available MIMO wireless transceivers. Also, there was no proper system existing in prior art to support both the MPTCP protocol and the regular or conventional TCP/UDP/SCTP using user specific interface mechanisms. In addition, the user has not been given a choice/freedom to decide the type of transmission protocols (MPTCP or TCP/UDP/SCTP or both) to be used based on their requirements. Also, a mechanism to periodically monitor the failure that occurs in network interface or MIMO systems and to intimate the failure to the network administrators has been lacking.

SUMMARY

Accordingly, an apparatus and method are herein disclosed for improving data transfer speed using Multipath Transport Protocol (MPTCP) and MIMO combination for use in computing systems and servers.

A method for improving data transfer speed by using Multipath Transport protocols in a network, the method comprising: receiving user parameters at an apparatus and determining which application to use which transport protocols using an application management system (AMS); sending the user parameters information to a middleware which operates between application management system (AMS) and transport protocols; and initiating transport protocols by the middleware upon receiving instructions from the application management system (AMS). The transport protocol comprises multipath transmission protocols (MPTCP), Transmission Control Protocols (TCP), User Datagram Protocol (UDP) and Stream Control Transmission Protocol (SCTP).

The middleware is a Selection, Inspection and Control (SIC) module, that can START and STOP the MPTCP or TCP/UDP/SCTP for sending data based on user input parameters. At least one network interface for TCP/UDP/SCTP protocols may be reserved by the middleware at startup time of the proposed apparatus or system and the middleware may also inspect the network interface status periodically and sends the failure information, if any, to the AMS. Each wired network interface of the system can be connected with wireless MIMO transceiver by using a cable (Ethernet cable) or each system may be attached with a MIMO wireless adapter which supports MIMO wirelessly.

Also, described an apparatus for improving data transfer speed in a network comprises: transport protocols, an Application Management System (AMS), and a SIC middleware which is housed between AMS and transport protocols. The transport protocols comprise MPTCP and TCP/UDP/SCTP.

The application management system is a graphical user interface embedded in the system and runs on an application layer and may be configured to allow user input parameters for data transmission. The middleware operates between the application management system (AMS) and the transport protocols. The middleware may STARTs and STOPs the MPTCP or TCP/UDP/SCTP for sending data to the destination systems based on user parameters.

DETAILED DESCRIPTION

Figure 1:
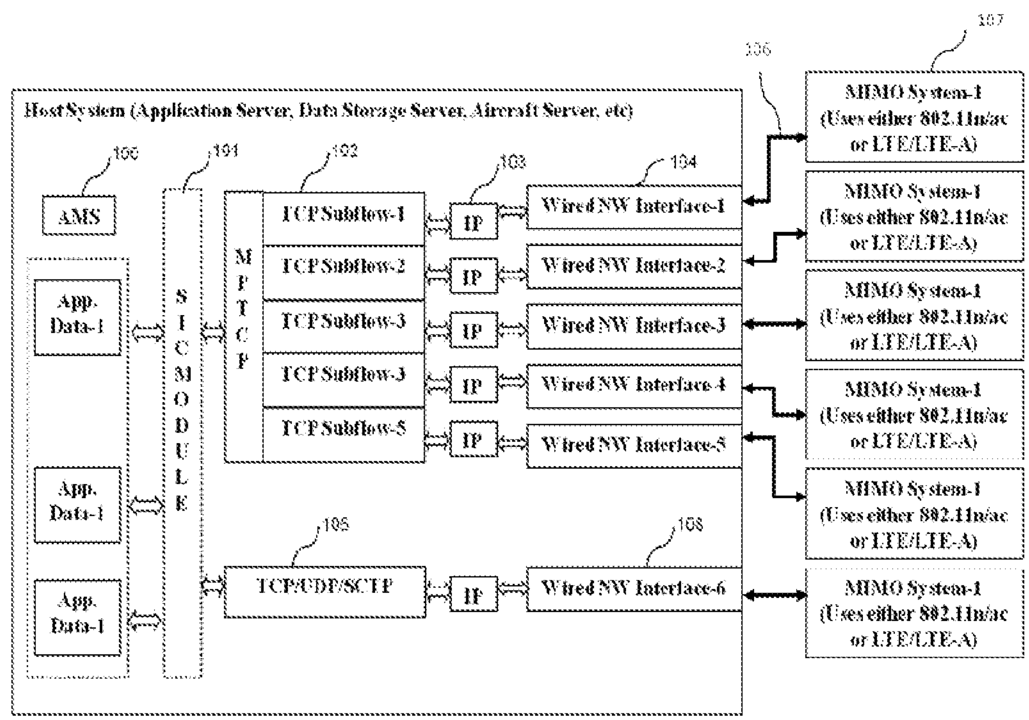
FIG. 1 illustrates architecture of the apparatus with MPTCP and multiple MIMO combination.

Embodiments of the present invention are explained more fully herein with reference to the accompanying drawings and detailed in the following description. Embodiments disclosed herein are intended to enable those skilled in the art to understand and practice the present invention and should not be construed as limited to the embodiments set forth.

Application Management System (AMS) Module: The AMS module is a graphical user interface (GUI) that operates in application layer to provide a user friendly interacting environment to run applications. The AMS module may be embedded in the system, and may receive the following user input parameters for one application instant, from the MPTCP enabled host system: application name, optional application command, protocol to use (TCP/UDP/SCTP/MPTCP), module field (either MPTCP module or TCP/UDP/SCTP module or both), application priority to start, application start time, number of attempts/times to run, system available network interface details (if MPTCP is selected, more than one interface needs to be selected), source and destination IP addresses, path of application (e.g. /usr/local/share/vlc), interface addresses for MPTCP connection, maximum transmission unit (MTU) size, maximum segment size (MSS). The AMS module may receive and display network failure information (informed by SIC module) and also manages and decides which applications can use MPTCP or regular TCP/UDP/SCTP based on the inputs received from the user and sets specific fields (based on the user input) and sends an application wrapper data to a Selection, Inspection Control (SIC) middleware module. If the user wishes to run more than one application, instances of the application are created and put in the AMS module GUI queue. Each application instance may be started based on the application start time as specified by the user inputs. Also, the AMS GUI interface has save, run options to provide the user to save the GUI user inputs at the database or separate Extensible Markup Language (XML) files. Once the user selects run instance, the GUI module may run and send the all user inputs to SIC module. The AMS module may provide the user, a flexibility to choose the network interfaces for MPTCP module and TCP/UDP/SCTP module.

SIC Middleware: The SIC middleware module/interface runs between application and transport layer of the host system or apparatus. The SIC module may be initiated or started when the mechanism gets started in the host system or apparatus and at this time SIC may reserve/retain at least one network interface for regular TCP/UDP/SCTP communication. The SIC module may receive input or data from AMS module through a connection interface or it may read the xml files by using xml parser mechanism to receive all the input parameters provided by the user in the form of wrapped data and accordingly STARTs or STOPs either MPTCP or TCP/UDP/SCTP modules or both in the host system. In addition, the SIC module may periodically monitor/inspect the usage status of network interfaces (including interface failure) and intimates the status to user or network administrator either by AMS module or by a network management system (a third-party application that have specific interface with the apparatus). The SIC module may receive the application wrapper data from AMS.

A connection interface existing between SIC and AMS module can be message queues, inter-process communication, MVC (Model View Controller) pattern, Google Web Toolkit (GWT), Rich Internet Applications (RIA) interface or simple read/write system calls. The SIC module may always maintain a connection with existing connected MIMO systems, to monitor if there are any problem/failure in MIMO systems like MIMO system shutdown. If any failure occurs in the MIMO system, the SIC module shuts down the corresponding MIMO system and remove the corresponding network interface from the MPTCP or TCP/UDP/SCTP flow and direct the MPTCP or TCP/UDP/SCTP module to use the remaining best network paths. Also the SIC module may intimate the MIMO system failure to the AMS module and provide options to the user via AMS module to select only working network interfaces or working MIMO transceiver connected to the network interfaces.

The SIC module may enable or disable the MPTCP or TCP/UDP/SCTP options on the available network interfaces based on the input received from AMS module. The AMS module may prevent the user from choosing the specific network interface corresponding to the failed MIMO system until it comes back again. Once the wireless interface comes up again, SIC module adds the interface to the MPTCP or TCP/UDP/SCTP connection.

If there is no need for the system to use TCP/UDP/SCTP module, then the module field of AMS wrapper may be set to MPTCP connection only option for data transmission and the SIC module need not reserve an interface for TCP/UDP/SCTP module.

MultiPath TCP (MPTCP): MPTCP is an Internet Engineering Task Force (IETF) protocol (RFC standard 6824, 6182) and it is an extension of current TCP standard to allow a single TCP stream to spread across wired or wireless multiple network interfaces as TCP subflows. The MPTCP is used at transport layer of internet stack to split the application traffic into multiple TCP sub-flow traffic and sends via wired or wireless network interface. Each subflow sends more data through its less congested path or interface to improve robustness of network performance and overall throughput. MPTCP may allow using all the available network interfaces, thereby enabling efficient large scale data transfer between systems with short period of time when compared to regular TCP. Usage of MPTCP may enable to use all the available network interfaces for efficient data connection and this may improve the network speed to multiple folds and may reduce the network congestion problem.

MIMO Systems: MIMO is a wireless technology that uses multiple transmitters and multiple receivers simultaneously to send and receive data. Multiple MIMO systems are used herein and each host machine (user machine) network interface can be connected to one MIMO transceiver system by a wired cable or each host machine can be connected to MIMO wireless adapters to receive and transmit data simultaneously. The MIMO system supports standards such as WIFI (802.11n, 802.11ac), Long Term Evolution (LTE), LTE-Advanced (LTE-A) to improve data throughput. MIMO systems may also include or extend to WiMax protocols, WiGig (802.11ad), etc.

Network Interface: The host machine network interfaces such as wired Gigabit network interface card or wireless Gigabit (Gbps) network adapter can be used in this invention. If wired Gigabit network interface card is used, then each network interface is connected to one MIMO wireless transceiver system using wired Ethernet cable.

A method and an apparatus are herein disclosed to improve data transfer speed in a network by using a combination of MPTCP and multiple MIMO transceivers. The method provides an improvement to the existing TCP stream based data transfer by using MPTCP at transport layer level and multiple wireless MIMO systems. The graphical user interface called ‘Application Management System (AMS)’ may be used to manage and decide which applications shall use MPTCP module or standard TCP/UDP/SCTP module based on different traffic requirement, file size, priority and user preference. A middleware module termed as ‘Selection Inspection Control (SIC) module’ may be included to START and STOP the MPTCP or TCP/UDP/SCTP module for respective applications to send data to the other end, based on the instructions given by AMS. The AMS and SIC middleware modules may provide complete control or flexibility to the user to use all the network interfaces for MPTCP connection or to maintain/reserve at least one defined network interface for normal TCP/UDP/SCTP connection over the available network interfaces. In addition, the user may be allowed to send data via both MPTCP and TCP/SCTP/UDP simultaneously. The MPTCP module and standard TCP/UDP/SCTP module are used to start the MPTCP protocol and TCP/UDP/SCTP protocol for data transmission. Each host machine network interface can be connected with a wireless MIMO apparatus such that the data received by each interface can be transmitted to the other end via MIMO system.

The host system or apparatus can be, for example personal computer, desktops, laptops, mobile applications, machine-to-machine communication devices or other communication devices.

The host system or apparatus both at transmission and receiving end may be provided with MPTCP module and TCP/UDP/SCTP module. The receiving end host system may also receive data by using TCP/UDP/SCTP module if it is not MPTCP enabled.

FIG. 1 illustrates the architecture of an apparatus with MPTCP and multiple MIMO combination.

As shown, the apparatus comprises an Application Management System (AMS) module (100) which is a user interface module that may receive input from user in order to manage and decide which applications can use MPTCP or conventional TCP/UDP/SCTP. The AMS sends a wrapped data comprising user inputs to a Selection, Inspection Control (SIC) middleware module (101). The AMS module may provide the user flexibility to choose the interfaces for MPTCP module (102) and TCP/UDP/SCTP module (105).

The SIC module (101) may receive the wrapped data from AMS (100), checks for the fields set by AMS (100) and collect data and accordingly STARTs and STOPs the MPTCP or regular TCP/UDP/SCTP for data transmission. In addition, the user may be allowed to send data via both MPTCP and TCP/SCTP/UDP simultaneously. Also the SIC module (101) may periodically monitors/inspects the usage status of network interfaces, including interface failure and intimates the status to user or network administrator through the AMS (100). The SIC module (101) has a connection interface to always maintain a connection with existing connected MIMO systems, so as to monitor if there is any problem/failure in MIMO systems like MIMO system shutdown and if any failure occurs, the SIC module may shut down the MIMO system and removes the corresponding network interface from the MPTCP flow and direct the MPTCP module (102) to use the remaining best network paths. The SIC module (101) may also inform the AMS module (100) so as to prevent the user from choosing the specific network interface (corresponding to the failed MIMO system) until it comes back again. Once the wireless interface comes up again, SIC module (101) adds the interface to the MPTCP connection and intimate to AMS module (100).

MPTCP module (102) and TCP/UDP/SCTP modules (105) are provided in the system for starting MPTCP protocol and TCP/UDP/SCTP protocols respectively. The MPTCP protocol splits the data traffic into multiple subflow traffic such as TCP Subflow 1-5 and sends each subflow via internet protocols (IP) (103) using available wired or wireless network interfaces of the system, here wired NW interface 1-6 (104, 108), thereby reducing the network congestion problem. Also the SIC module (101) may start the TCP/UDP/SCTP module (105) to send the data (TCP subflow-5) to the destination host system using wired NW interface-6 (108). The data can be transmitted to the receiver host system by using multiple MIMO systems (MIMO System 1-5) wherein each MIMO system may be connected to one interface of the host system by wired cable (106). Also wireless MIMO adapter (not shown in figure) can be connected with the host system and communicates with receiver host system wirelessly. The MIMO system supports standards such as WIFI (802.11n, 802.11ac), Long Term Evolution (LTE), LTE-Advanced (LTE-A) to improve data throughput.

Figure 2:
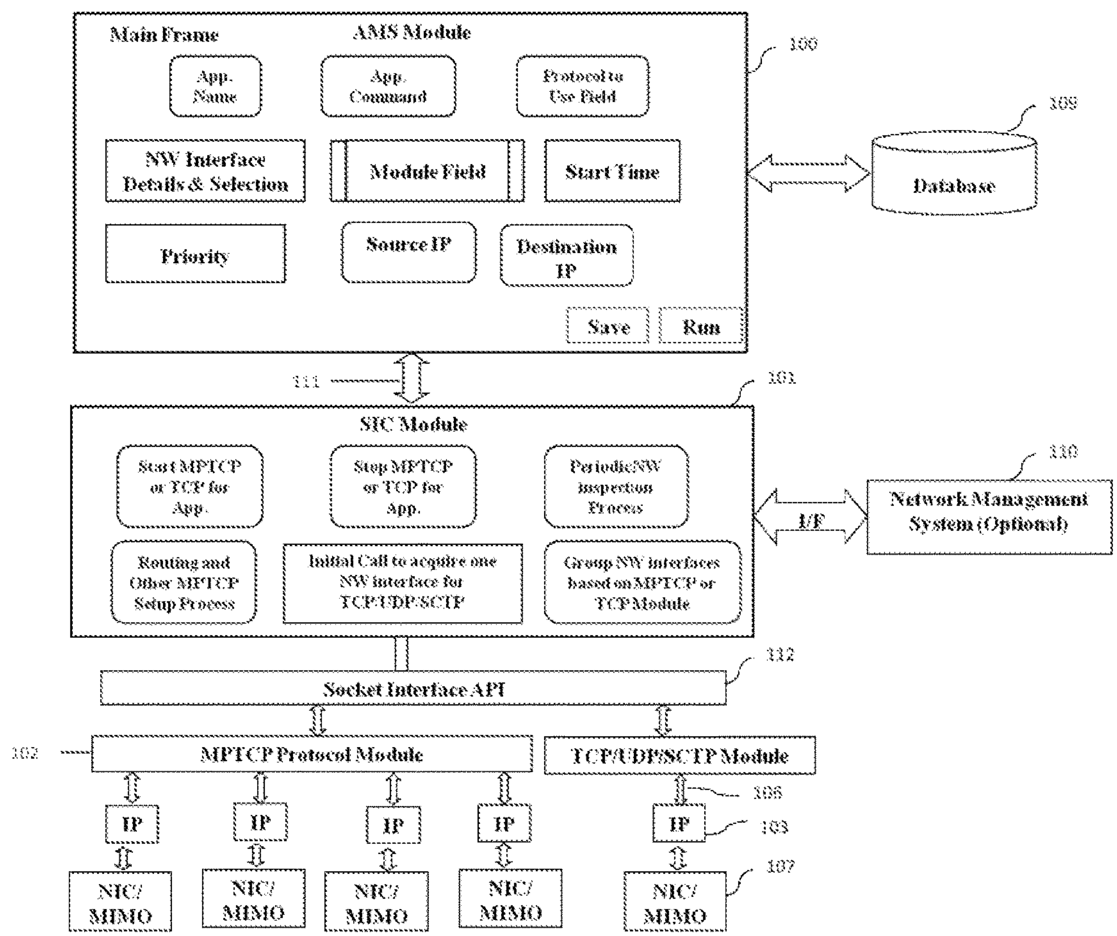
FIG. 2 illustrates system, method and apparatus involved for data transmission in a network.

FIG. 2 illustrates system, method and apparatus involved for data transmission in a network. As shown, the system includes an AMS module (100) which is a GUI interface module running at application layer to provide a user friendly interaction environment to run applications. AMS module (100) may receive inputs from user for each application and may send those received inputs to SIC module (101). AMS comprises various fields such as fields Application name, Optional Application command and the like. The SIC module (101) may run commands at the backend for standard applications like File Transfer Protocol (FTP), Secure Copy (SCP), Video LAN Client (VLC) and other than the standard applications, the user may be required to provide the command to run that specific application in this field. Other fields include Application priority to start, Application Start time, Protocol to use (MPTCP or TCP or UDP or SCTP), Module field (MPTCP module or TCP/UDP/SCTP module or both), Path of application (example:/usr/local/share/vlc), Number of times to run, System available network interfaces details, Source IP address and Destination IP address. If user requires both MPTCP and TCP module, then they can select network interfaces for MPTCP module (102) and TCP/UDP/SCTP module (105).

The first available network interface may be allocated to TCP/UDP/SCTP communication by default and all other interfaces are allocated for MPTCP communication. If user requires more than one interface for TCP/UDP/SCTP or multimedia streaming applications, then user can be set which are the interfaces to use for TCP/UDP/SCTP and which other interfaces for MPTCP connection at AMS GUI interface. In addition, the fields such as MTU (Max. transmission Unit) size, MSS (Maximum Segment Size) and Network interface failure information (SIC module monitors whether any failure of network interfaces or MIMO systems, if it finds any failure then SIC may inform to this field for user attention via AMS module) are the other fields input by the user for one application instant. The input fields at AMS module may extend further in future. If the user wants to run more than one application, then more instances of the application are created and put in the AMS module GUI queue. Each application instance can be started based on the Application start time as in above inputs. Also, AMS GUI interface have save, run options which may provide the user to save the GUI user inputs at database or separate xml files. Once user select run instance, the GUI module may run and send the all user inputs to SIC module. The AMS module may provide the user flexibility to choose the interfaces for MPTCP module and TCP/UDP/SCTP module.

The Selection, Inspection and Control (SIC) middleware module (101) gets started when the mechanism or solution is initiated in a host system. The SIC may receive data from the AMS module either through a connection interface (111) or it may read the saved xml files by using xml parser mechanism to get the all user input data corresponding to the application from the AMS module, it performs the backend process to START and STOP either MPTCP or TCP/UDP/SCTP modules or both at a given time in the host system, monitors the network interfaces periodically, sends network failure details to AMS module by an interface, and if any third party network management system is connected to the host system, then SIC module sends the monitoring data to that network management module/system (optionally used in a large network environment) as well by using specific interface. During the start of the host system, the SIC module may reserve at least one network interface for TCP/UDP/SCTP communication, which enables the user to send data via both MPTCP and TCP/SCTP/UDP simultaneously. The connection interface between the AMS module and SIC module are such as message queues, inter-process communication, MVC (Model View Controller) pattern, Google Web Toolkit (GWT), RIA (Rich Internet Applications) interface or simple read/write system calls. The communication between the SIC module and the MPTCP module may be done through socket interface (112).

The MPTCP protocol splits the data traffic into multiple TCP subflow (1-5) and sends each subflow via wireless MIMO transceivers (107) using available network interfaces (NICs) of the system (internet protocols (IP)) used at network layer (103). Each wireless MIMO transceiver can be in wired connection (106) with one network interface of the system.

The TCP/UDP/SCTP module may be included in this proposed system and at system startup time one network interface reserved for its purpose, the reason is to provide the user flexibility to connect non-MPTCP enabled hosts via this interface module and less priority applications (applications which are not required data speed and throughput like video streaming, VOIP applications, etc) via this module. If user does not require this module, then they can select only MPTCP option via AMS module.

Figure 3:
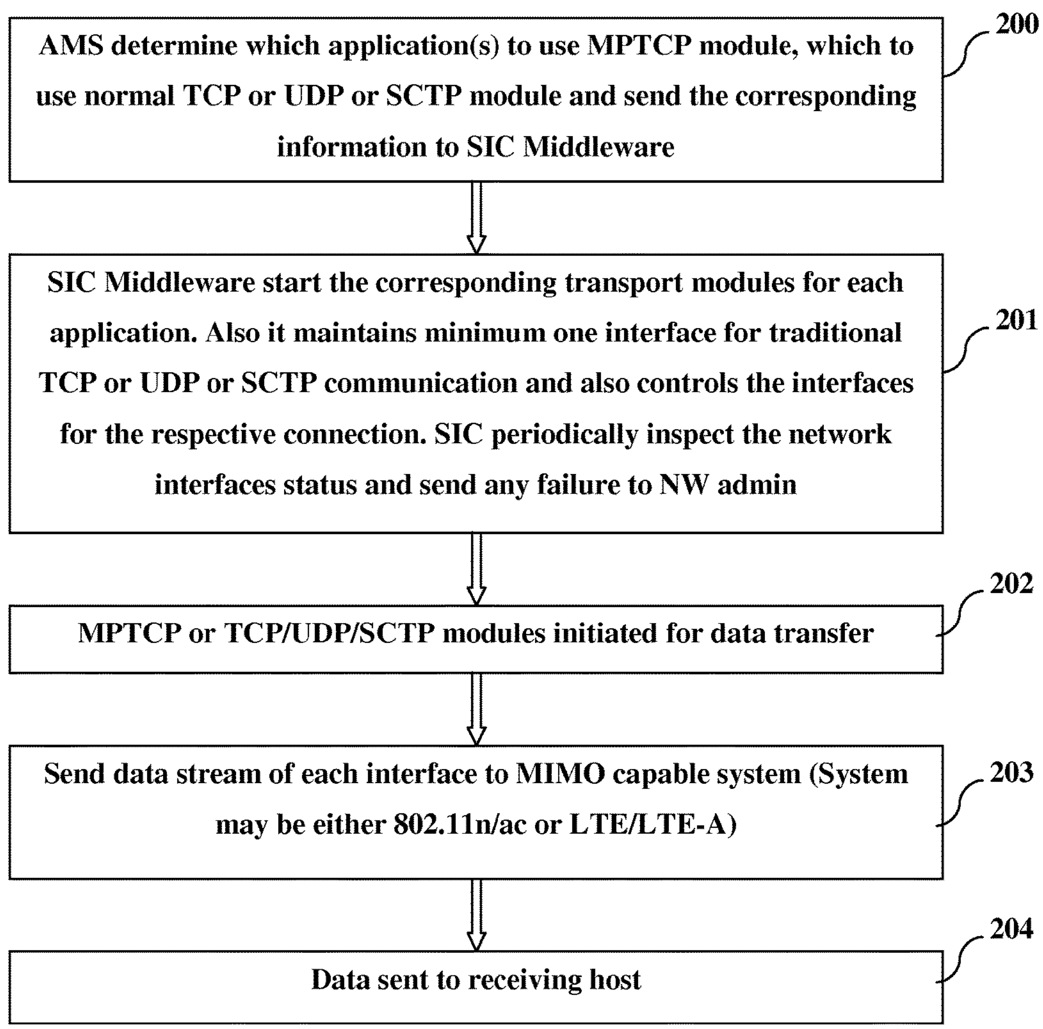
FIG. 3 illustrates a flow chart of a method and system for transmitting data in a host system or apparatus.

FIG. 3 illustrates a flow chart of a method and system for transmitting data in a host system or apparatus. Below is described, In Step (200):

Receiving User Input Parameters:

Allowing the user to input their preferences for sending data to the destination system, by using a graphical user interface called as 'Application Management System (AMS) '. The AMS module includes the following fields to receive user input parameters, such as application name, application command, application priority to start, application start time, protocol to use, module field, path of application, number of times to run, network interface availability, source and destination IP address, Max. Transmission Unit (MTU) size, Max. Segment Size (MSS) and network interface failure information (this information may be received by AMS from SIC module).

Determining Transport Protocols:

The AMS module may receive user input and specifies which applications to use MPTCP module and which to use TCP/UDP/SCTP module based on the received user inputs.

In Step 201:

Sending to SIC Module:

The AMS module sends user inputs to Selection, Inspection and Control (SIC) middleware module, so that the SIC module reads the user input and determines which applications to use MPTCP module and which to use TCP/UDP/SCTP module based on the received user inputs and accordingly STARTs and STOPs the corresponding transport modules and enables data transfer through either MPTCP or TCP/UDP/SCTP. The SIC module also maintains or reserves at least one network interface for conventional TCP/UDP/SCTP communication thereby enabling the user to send data via both MPTCP and TCP/SCTP/UDP simultaneously. In addition the SIC module periodically inspects the status of network interfaces for reporting any failures to the user or network administrator via the AMS module.

In Steps 202, 203, 204:

Data Transmission:

When the SIC module initiates the MPTCP module, it splits the data traffic into multiple TCP subflows by using MPTCP protocol (rfc 6824) and sends each subflow via available wired network interfaces. The wired networks are connected to MIMO systems for enabling data transmission to the destination host system at the receiving end. The MIMO system supports LTE/LTE-A or WIFI (802.11n/ac) wireless standards.

Figure 4:
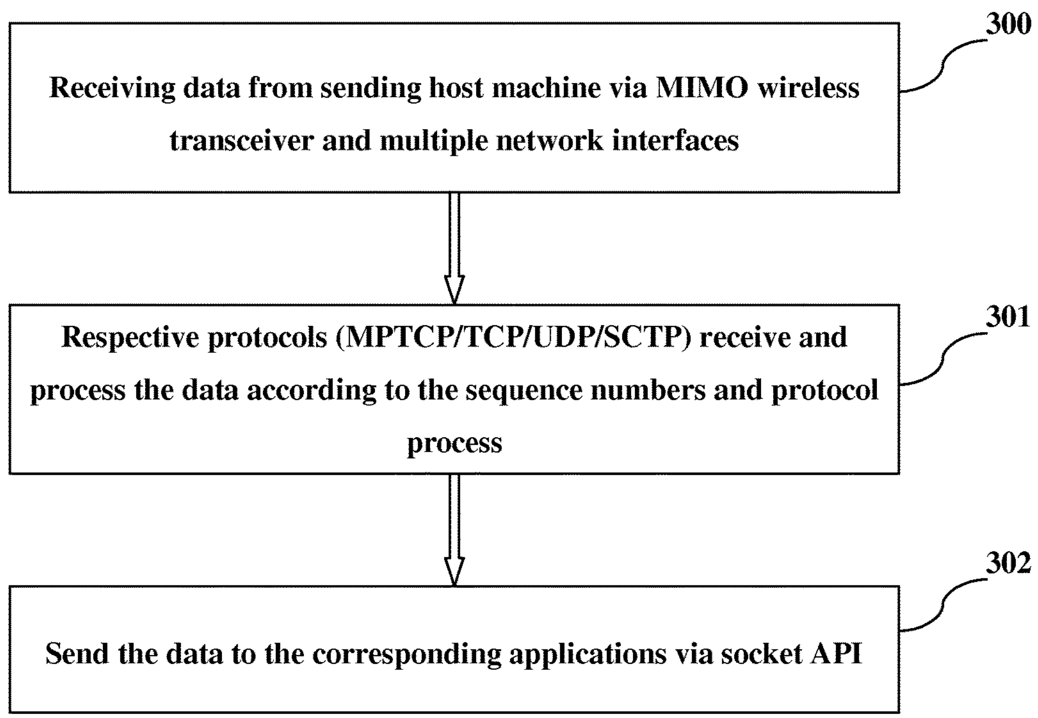
FIG. 4 illustrates a flow chart of a method and system for receiving data in the receiving side host system or apparatus.

FIG. 4 illustrates a flow chart of a method and system for receiving data in the receiving side host system or apparatus. Below is described, In Step 300:

The receiving side host system may receive the data stream sent from host system via MIMO systems and multiple interfaces and sends to appropriate transport protocol modules such as MPTCP protocol module or TCP/UDP/SCTP protocol module.

In Steps 301 & 302:

The modules processes the data stream according to the sequence numbers and protocol process and sends the respective data to the application. The MIMO system supports LTE/LTE-A or WIFI (802.11n/ac) wireless standards.

Figure 5:
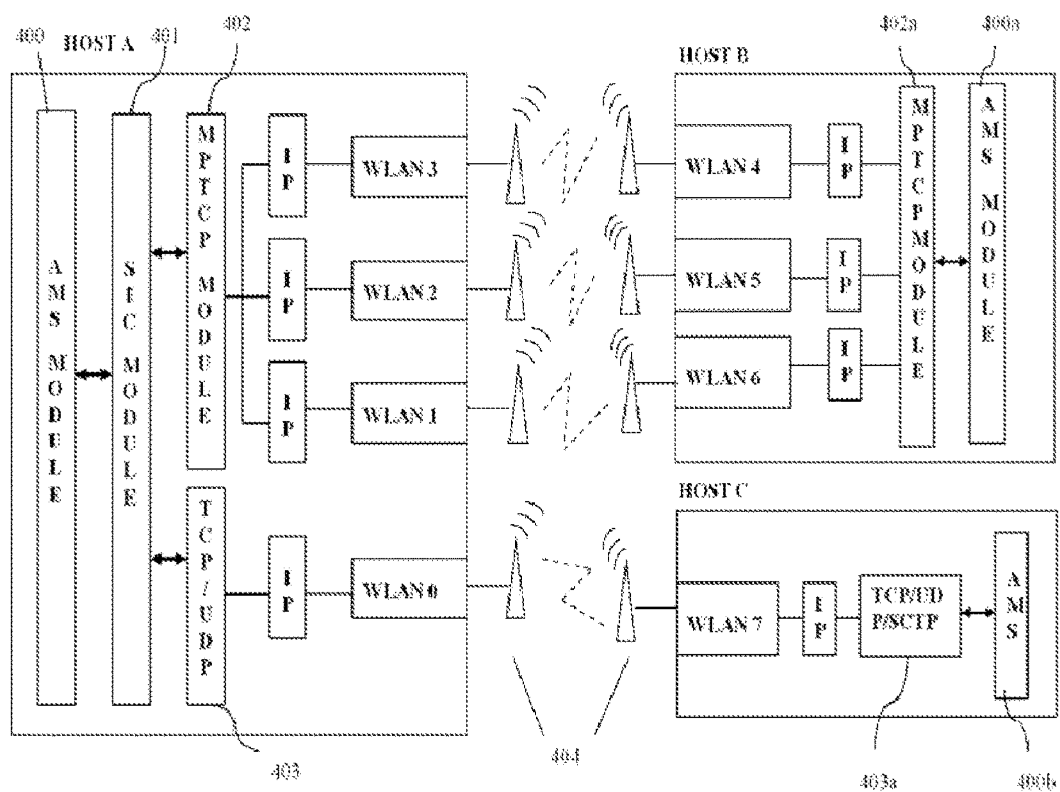
FIG. 5 illustrates the data transmission between a host and two destination host systems in a network.

FIG. 5 illustrates the data transmission between a host and two destination host systems in a network.

As shown, the Host A at the transmission side is MPTCP as well as TCP/UDP/SCTP enabled and Host B at the receiving side is only MPTCP enabled, while the Host C system at the receiving side is only TCP/UDP/SCTP enabled. The Host system (Host A) at the transmitting end comprises an Application Management System (AMS) module (400) for receiving user input parameters for deciding whether to use MPTCP module (402) or regular TCP/UDP/SCTP module (403) for sending data to the host systems (Host B, Host C) at the receiving end. The Host A (at transmitting end) also includes a Selection, Inspection and Control (SIC) module (401) to START and STOP the transport protocols based on the user input parameters sent by the AMS module (400). The receiving end host systems do not necessarily posses AMS and SIC modules to receive data from host system at transmitting end. The MPTCP module of Host A (transmitting end) splits the data traffic into several subflows for sending each subflow to the network interfaces such as wlan1, wlan2 and wlan3. Each interface (at transmitter and receiver end) is connected to one Multiple-Input-Multiple-Output (MIMO) system (404) for enabling data transfer as well as receiving data to the destination side host systems. The data sent via MPTCP of the Host A is sent to the Host B (MPTCP enabled), via wlan4, wlan5, wlan6 where the data is received via MIMO (404) and is sent to appropriate MPTCP module (402*a*) and the data sent via the TCP/UDP/SCTP module of Host A is sent to Host C (not MPTCP enabled), via wlan0 and wlan7, where the data is received via MIMO (404) and is sent to appropriate TCP/UDP/SCTP module (403*a*). The connection interface between the AMS module and SIC module can be message queues, inter-process communication, MVC (Model View Controller) pattern, Google Web Toolkit (GWT), RIA (Rich Internet Applications) interface or simple read/write system calls. The MIMO system supports LTE/LTE-A or WIFI (802.11n/ac) wireless standards.

We claim:

1. An apparatus for improving data transfer speed in a network comprising:

a processor;

memory storing modules to be executed by the processor, the modules comprising:

an Application Management System (AMS) module configured to receive at least one user input to manage and determine at least one application to use for enabling data transfer through a data transfer means, wherein the data transfer means comprises a multipath transmission control protocol (MPTCP), and at least one of a transmission control protocol (TCP), user datagram protocol (UDP), or stream control transmission protocol (SCTP); and a selection, inspection and control (SIC) module configured to start and stop the MPTCP and the at least one of TCP, UDP, or SCTP simultaneously, based on user input received from the AMS module, for transmitting data to destination host systems which are located at different locations, wherein the MPTCP is configured to split the data into a plurality of subflows; and at least one network interface, wherein each of the at least one network interface are connected to one multiple-input multiple-output (MIMO) system to send each of the plurality of subflows.

2. The apparatus of claim 1, wherein the application management system (AMS) module is configured to allow the user to input parameters for sending data.

3. The apparatus of claim 1, wherein the selection, inspection and control (SIC) module is further configured to:

reserve at least one network interface for transmission control protocol (TCP)/user datagram protocol (UDP)/stream control transmission protocol (SCTP) protocols;

inspect network interface status periodically; and inform any interface failure information to user through application management system (AMS) module.

4. The apparatus of claim 1, wherein the apparatus is further connected to a plurality of input multiple-output (MIMO) transceivers.

5. The apparatus of claim 4, wherein the MIMO transceivers are wirelessly connected at both transmitting and receiving end.

6. The apparatus of claim 5, wherein the MIMO transceivers are a combination of at least one of wired and wireless connection at both transmitting and receiving ends.

7. A method in an apparatus for improving data transfer speed using multipath transport control protocols in a network, the method comprising:

receiving at least one user input on the type of transport protocols to be used for sending data through an Application Management System (AMS) module;

executing the at least one user input received from the AMS module by a selection, inspection and control (SIC) module located between the AMS module and transport protocols comprising multipath transmission control protocol (MPTCP) and at least one of transmission control protocol (TCP), user datagram protocol (UDP), or stream control transmission protocol (SCTP);

start and stop the MPTCP and the at least one of TCP, UDP, or SCTP simultaneously, based on user input received from the AMS module, for transmitting data to destination host systems which are located at a different locations;

splitting the data into a plurality of subflows by using the MPTCP; and sending each of the plurality of subflows using at least one network interface, wherein each of the at least one network interface are connected to one multiple-input multiple-output (MIMO) system.

8. The method as claimed in claim 7, wherein the application management system (AMS) module is further configured to allow the user to input parameters for sending data.

9. The method as claimed in claim 7, said method further comprises:

reserving at least one network interface for regular transmission control protocol (TCP)/user datagram protocol (UDP)/stream control transmission protocol (SCTP) protocols by the selection, inspection and control (SIC) module;

inspecting the network interface status periodically; and sending the interface failure information, if any, to user by the selection, inspection and control (SIC) module.

10. The method as claimed in claim 7, wherein the network interface is connected to a plurality of wireless multiple-input multiple-output (MIMO) transceivers.

11. The method as claimed in claim 10, wherein the transceivers are a combination of at least one of wired and wireless connection at both transmitting and receiving end.

* * * * *